United States Patent [19]

Bannai

[11] Patent Number: 5,040,989
[45] Date of Patent: Aug. 20, 1991

[54] CLOCK SPRING
[75] Inventor: Hiroyuki Bannai, Furukawa, Japan
[73] Assignee: Alps Electric Co., Ltd., Tokyo, Japan
[21] Appl. No.: 648,494
[22] Filed: Jan. 30, 1991
[30] Foreign Application Priority Data
Feb. 6, 1990 [JP] Japan .............................. 2-10166[U]
[51] Int. Cl.⁵ ............................................ H01R 35/00
[52] U.S. Cl. ....................................... 439/164; 439/15
[58] Field of Search ....................... 439/4, 13, 15, 164;
74/484 R

[56] References Cited
U.S. PATENT DOCUMENTS
4,721,469 1/1988 Carlson .................................. 439/13
4,978,191 12/1990 Hasegawa et al. ............. 439/164 X FOREIGN PATENT DOCUMENTS
2747126 4/1979 Fed. Rep. of Germany ........ 439/13

Primary Examiner—Eugene F. Desmond
Attorney, Agent, or Firm—Guy W. Shoup; B. Noel Kivlin

[57] ABSTRACT

A clock spring which is used in a steering system of a vehicle and which electrically connects, by means of a cable, a stationary member with a movable member supported in such a manner as to be rotatable relative to the stationary member. Cable members are received in a receptacle defined by the stationary and movable members, and a pair of rotary members having mutually communicating openings are rotatably interposed between the stationary and movable members, with the receptacle being bisected into two compartments by the rotary members. Each flexible cable has a first section which is wound in either of two opposite directions and is capable of being received in either of the two compartments, and a second section which is passed through the openings, wound in the other direction and capable of being received in the other compartment.

2 Claims, 4 Drawing Sheets

CLOCK SPRING

BACKGROUND OF THE INVENTION

1. Field of the Invention

The present invention relates to a clock spring which is used in a steering system of a vehicle to establish an electrical connection between a stationary member and a movable member by means of a flexible cable.

2. Description of Related Art

A clock spring comprises a stationary member, a movable member rotatably supported relative to the stationary member and a flexible cable connecting these members together, and is used as an electrical connection device for, e.g., a steering system of a vehicle A clock spring of this type includes, as is already known, a flat cable received in a cable receptacle between a stationary member and a movable member The flat cable comprises a plurality of electrically conductive wires laminated with a pair of narrow strips of film, and is loosely received in the receptacle as the cable is spirally wound. The outer end of the flat cable is fixed to an outer annular wall formed on either the stationary or movable member, with the inner end being fixed to an inner annular wall formed on the other member.

The clock spring is such tat, when the movable member is rotated relative to the stationary member, a part of the flat cable, loosely received in the cable receptacle, is either wound onto the inner annular wall or unwound therefrom, depending on the direction in which the movable member is rotated. Thus, the part of the cable between its inner and outer ends can be displaced toward either the inner annular wall or the outer annular wall. The flat spring is substantially free from tensile force if the displacement takes place within the range between the position where the greater part of the flat cable is completely wound on the inner annular wall and the position where it is completely unwound therefrom. In this way, the flat cable acts to maintain an electrical connection between the stationary and movable members which rotate relative to each other.

In the clock spring, the flat cable is wound or unwound by utilizing the difference in diameter between the outer annular wall and the inner annular wall. Therefore, if the amount of rotation of the movable member is the same, a greater difference in the diameter allows a greater reduction in the length of the flat cable. However, the diameter of the inner annular wall is determined, in a one-to-one relation, by the diameter of the rotary shaft, such as the steering shaft of the vehicle, to which the clock spring is mounted. On the other hand, the diameter of the outer annular wall cannot be made very large in view of the requirement that the entire apparatus should be as small as possible. For these reasons, the difference between the diameter of the outer annular wall and that of the inner annular wall cannot be very large. As a result, it has generally been required that a clock spring of the type being discussed have a considerably long flat cable. A long flat cable, such as that in the known clock spring, involves various manufacturing difficulties, which inevitably increase the total production cost of the clock spring.

SUMMARY OF THE INVENTION

The present invention has been accomplished in view of the above-described circumstances. An object of the present invention is to provide a clock spring which can be produced at low cost and assembled with ease.

In order to achieve the above-stated object, according to the present invention, there is provided a clock spring having a stationary member, a movable member supported in such a manner as to be rotatable relative to the stationary member and a flexible cable received in a cable receptacle defined by the stationary and movable members, one end of the flexible cable being fixed to the stationary member and extended to the outside thereof, the other end of the flexible cable being fixed to the movable member and extended to the outside thereof; the improvement in the clock spring comprising: first and second rotary members superimposed on each other and interposed between the stationary and movable members in such a manner as to be rotatable relative thereto and bisect the cable receptacle into two opposing compartments, the first and second rotary members having openings communicating with each other; two groups of cable receiving grooves positioned in the two opposing compartments of the cable receptacle, each of the groups comprising a plurality of concentric cable receiving grooves, the two groups being formed on surfaces of the stationary and movable members which are in different compartments of the receptacle; and a plurality of flexible cables each having two sections which are wound in two opposite directions and which are capable of being wound into the cable receiving grooves belonging to different groups, some of the flexible cables having first sections wound in the first of the two opposite directions and second sections passed through the openings and wound in the second direction, the remaining flexible cables having first sections wound in the second direction and second sections passed through the openings and wound in the first direction.

When the movable member is rotated in one of two opposite directions, a length of each flexible cable corresponding to one half of the amount of this rotation is unwound from the cable receiving groove of either the stationary or movable member, then, through the openings of the first and second rotary members, wound into the cable receiving groove on the other member. In this movement, each flexible cable which is received in the cable receiving groove of the movable member and which is wound in the direction opposite to the direction of rotation of the movable member abuts the peripheral edge of the openings where the flexible cable is bent backward. The bent portion of the flexible cable drives the rotary members to rotate them, thereby allowing each flexible cable wound in the other direction to be smoothly unwound as the rotary members rotate.

The clock spring is assembled in the following manner. The greater parts of some of the flexible cables which are wound in one of two different directions are coiled and received in the cable receiving grooves of the movable member, utilizing the first rotary member. The greater parts of the remaining cables which are wound in the other direction are coiled and received in the cable receiving grooves of the stationary member, utilizing the second rotary member. Thereafter, the movable and stationary members are rotatably coupled to each other while simultaneously allowing the first and second rotary members to be superimposed on each other.

BRIEF DESCRIPTION OF THE DRAWINGS

FIGS. 1 to 7 illustrate an embodiment of the present invention, in which

FIG. 1 is an exploded perspective view of a clock spring according to the embodiment;

FIG. 2 is a partially cut-away plan view of the clock spring;

FIG. 3 is a sectional view of the clock spring, taken along the axis of rotation;

FIG. 4 is a view showing the bottom of an upper case of the clock spring;

FIGS. 5 and 6 are views showing the movement of flexible cables of the clock spring; and FIG. 7 is a view used to explain processes of assembling the clock spring.

DESCRIPTION OF THE PREFERRED EMBODIMENT

Figure 1:
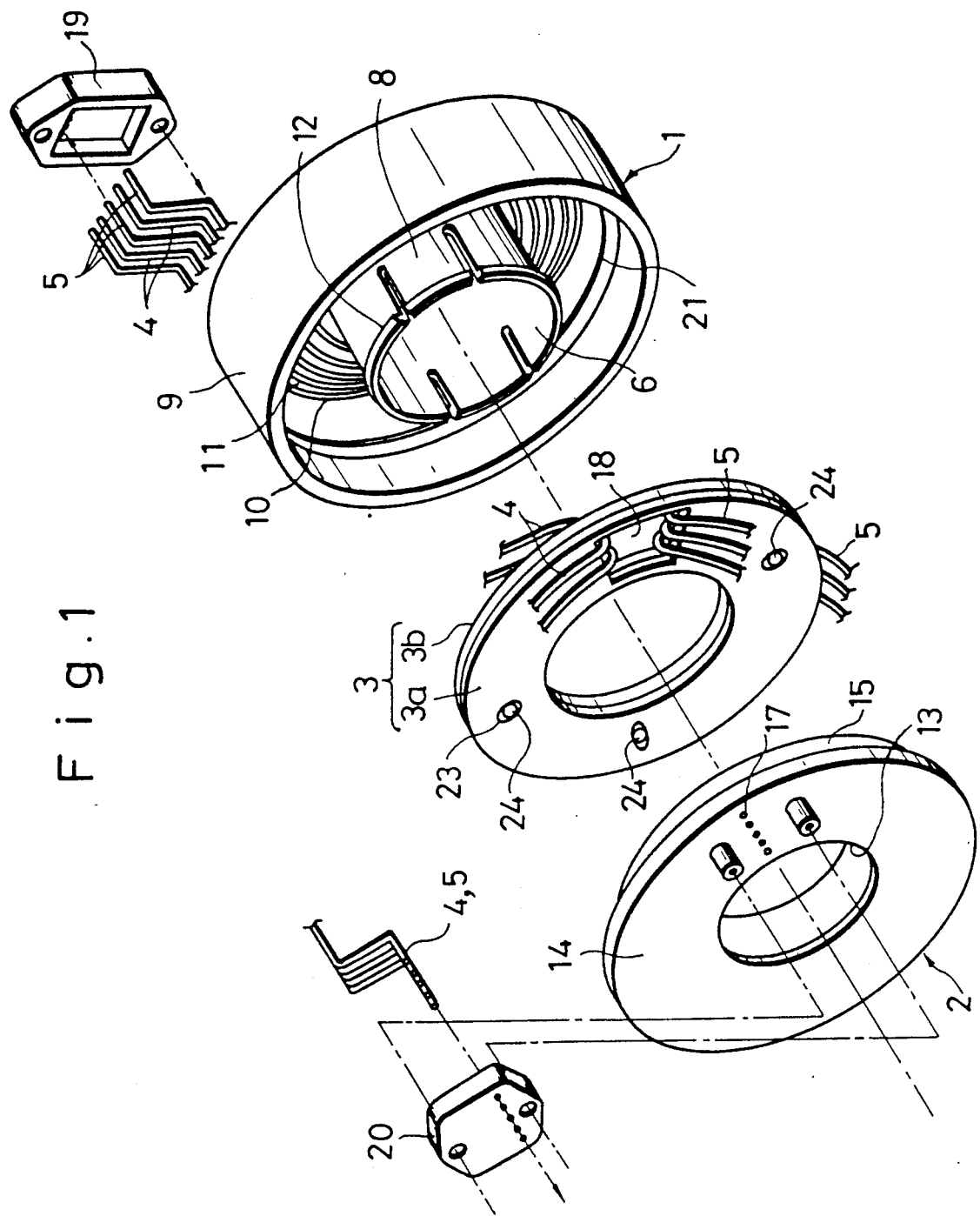

The present invention will now be described with respect to the preferred embodiment thereof which is illustrated in the drawings.

Figure 2:
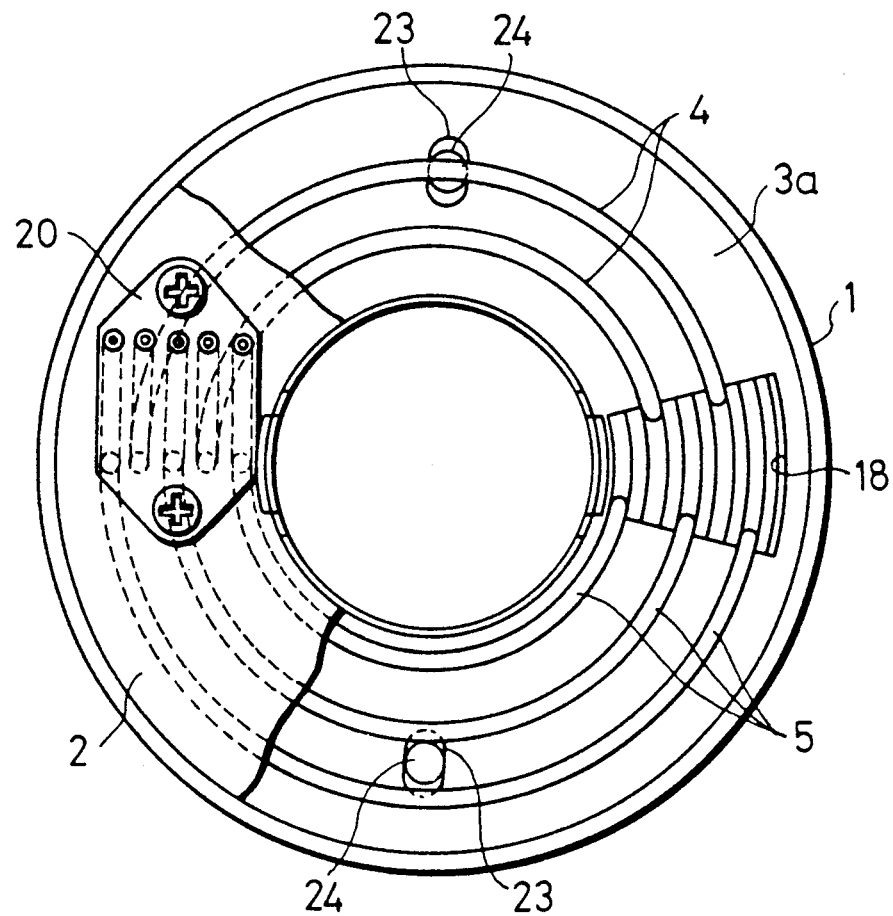
Figure 3:
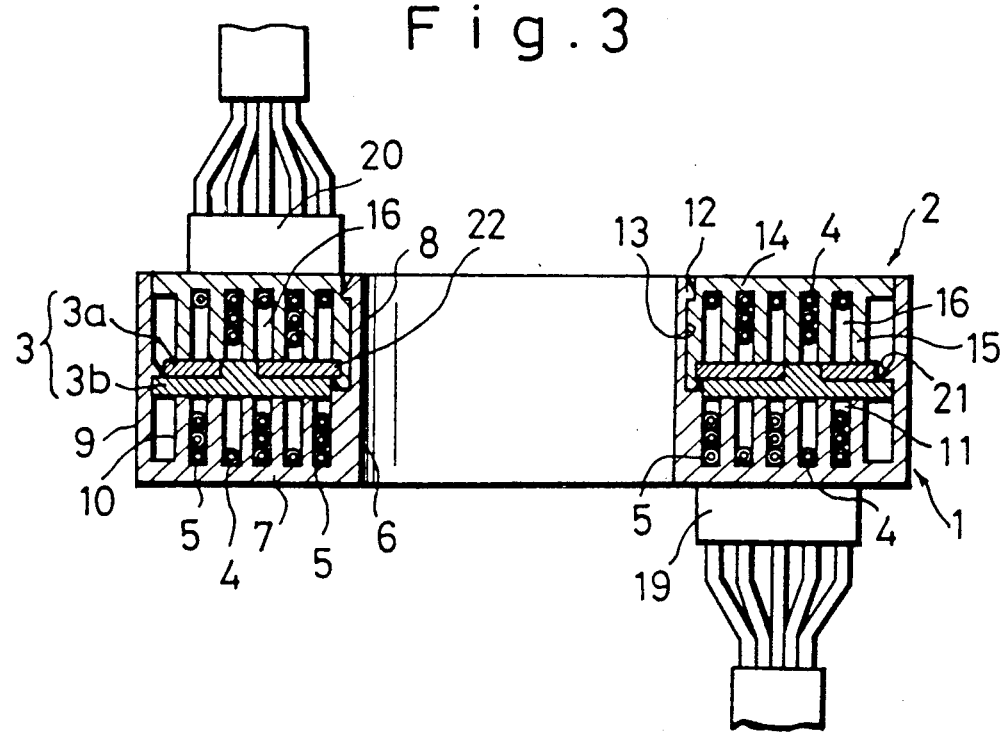

As shown in FIGS. 1 to 3, a clock spring embodying the present invention basically comprises a lower case 1, an upper case 2 supported in such a manner as to be rotatable relative to the lower case 1, a spacer 3 interposed between the upper and lower cases 1 and 2 in such a manner as to be rotatable relative thereto, and a plurality of flexible cables 4 and 5 wound and received in the space, or a cable receptacle, defined by the cases 1 and 2.

The lower case 1 is generally formed into a closed-end cylindrical shape, and it includes a bottom plate 7 having a central hole 6 opening in the center, and inner and outer peripheral walls 8 and 9 projecting from the inner and outer peripheries of the bottom plate 7, respectively. A plurality of ridges 10 are concentrically formed on the bottom plate 7 and around the central hole 6, and protrude on the side of the plate 7 on which the walls 8 and 9 project. Two adjacent ones of the ridges 10 define a groove therebetween so that a plurality of (five, in this embodiment) concentric grooves are formed by the ridges 10. These grooves serve as first cable receiving grooves 11. Although not shown, each of the grooves 11 has a cable extension hole formed through the bottom thereof. The distal (upper, as viewed in FIG. 3) end of the inner peripheral wall 8 has a flange 12. The outer peripheral wall 9 has an engagement protrusion 21 at an axially intermediate position of the wall 9.

Figure 4:
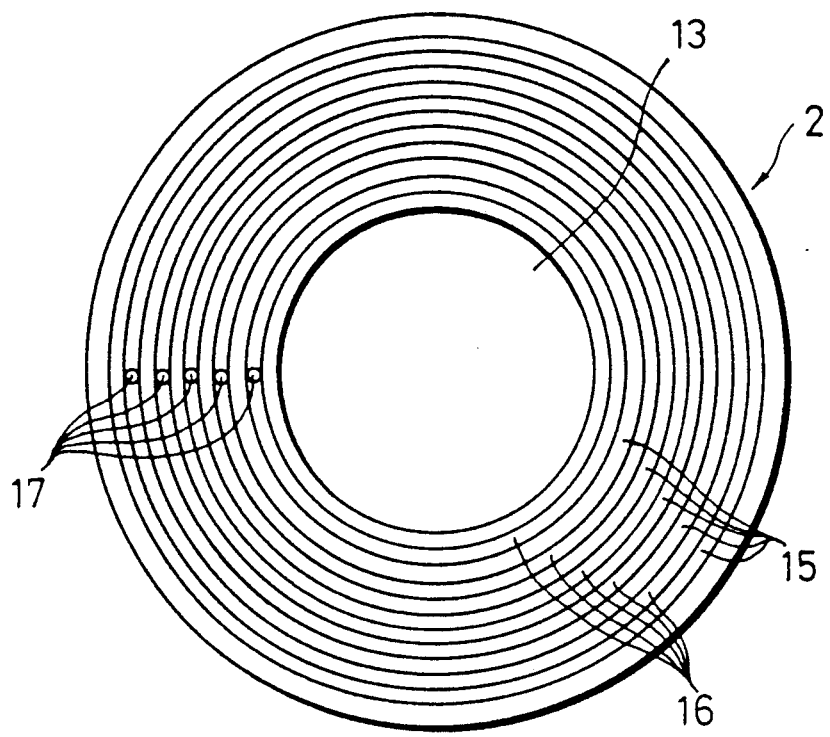

As shown in FIG. 4, the upper case 2 includes a top plate 14 with a central hole 13 opening in the center. The upper case 2 is rotatably coupled to the lower case 1 by utilizing the flange 12 to snap-fit the upper case 2 on the inner peripheral wall 8 of the lower case 1. A plurality of ridges 15 are concentrically formed on the top plate 14 and around the central hole 13, and protrude downward, as viewed in FIG. 3. The radially innermost ridge 15 has an engagement stepped portion 22 at the distal end thereof. Two adjacent ones of the ridges 15 define a groove therebetween so that a plurality of (five, in this embodiment) concentric grooves are formed by the ridges 15. These grooves serve as second cable receiving grooves 16. The second cable receiving grooves 16 oppose the first cable receiving grooves 11, and the two groups of the grooves 11 and 16 are positioned on either side of the spacer 3, described in detail later. Each of the grooves 16 has a cable extension hole 17 formed through the bottom thereof.

The spacer 3 comprises a pair of disk-shaped members; namely, a first spacer member 3a serving as the first rotary member, and a second spacer member 3b serving as the second rotary member. The members 3a and 3b have openings 18 which communicate with each other. The members 3a and 3b are made of a material, such as a synthetic resin, which allows smooth sliding thereon. The first and second spacer members 3a and 3b are joined together by inserting three pins 24 projecting from the second spacer member 3b into three elliptic bores 23 formed in the first spacer member 3a. The spacer members 3a and 3b thus united are rotatably interposed between the cases 1 and 2, bisecting the space between the first cable receiving grooves 11 and the second cable receiving groves 16 into two compartments.

The flexible cables 4 and 5 are members of a wire harness having conductive wires covered with an insulating material. In this embodiment, the wire harness comprises five flexible cables consisting of two flexible cables 4 (first flexible cables 4) wound in one of two different directions, and three flexible cables 5 (second flexible cables 5) wound in the other direction. Specifically, each of the first flexible cables 4 has a section thereof, i.e., a section close to one end thereof, wound in the counter-clockwise direction into one of the first cable receiving grooves 11 of the lower case 1, with the second section of the cable 4, i.e., the section close to the other end thereof, being passed through the openings 18, bent backward approximately through one half of a turn, and wound in the clockwise direction into one of the second cable receiving grooves 16 of the upper cable 2. On the other hand, each of the second flexible cables 5 has a section thereof, i.e., a section close to one end thereof, wound in the clockwise direction into one of the first cable receiving grooves 11, with the second section of the cable 5, i.e., the section close to the other end thereof, being passed through the openings 18, bent backward approximately through one half of a turn, and wound in the counterclockwise direction into one of the second cable receiving grooves 16. As shown in FIG. 3, one of the respective ends of each flexible cable 4 or 5 is extended through the cable extension hole (not shown) to the outside of the lower case 1. These extended ends are crank-shaped and fixed to a holder 19 secured to the lower surface of the bottom plate 7 of the case 1, and are then assembled into a single bundle, and connected with a lower connector (not shown). Similarly, the other end of each flexible cable 4 or 5 is extended through the cable extension hole 17 to the outside of the upper case 2. These extended ends are crank-shaped and fixed to a holder 20 secured to the upper surface of the top plate 14 of the case 2, and are then assembled into a single bundle, and connected with an upper connector (not shown).

Figure 5:
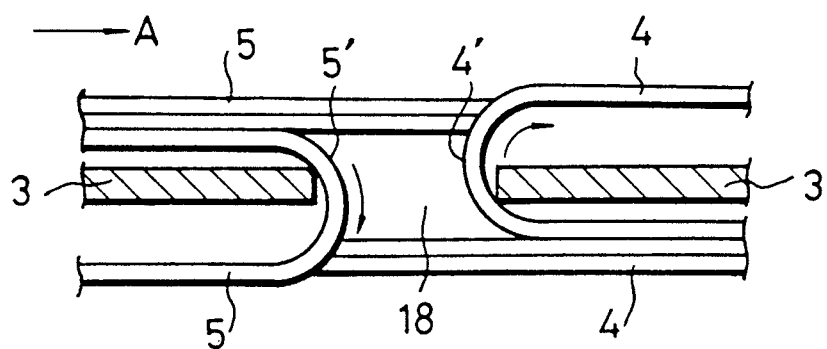
Figure 6:
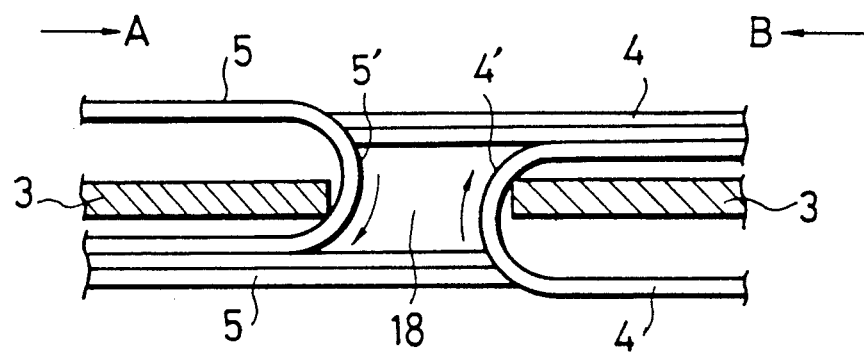

The operation of the clock spring according to this embodiment will be described with reference to FIGS. 5 and 6, concerning the case where, for example, the lower case 1 serves as the stationary member and the upper case 2 serves as the movable member. In FIGS. 5 and 6, the first and second spacer members 3a and 3b are shown together as the spacer 3, and one of the first flexible cables 4 as well as one of the second flexible cables 5 are schematically shown. The illustration of the lower and upper cases 1 and 2, etc. is omitted in these drawings.

FIG. 5 shows a position of the clock spring in which the greater part of each first flexible cable 4 is wound into one of the first cable receiving grooves 11 of the lower case 1, whereas the greater part of each second flexible cable 5 is wound into one of the cable receiving grooves 16 of the upper case 2.

When the movable member (the upper case 2, in this case) is rotated from the position shown in FIG. 5 through a given amount in the counter-clockwise direction (the direction of the arrow A), bent portions 4' and 5' of the first and second flexible cables 4 and 5, respectively, are shifted in the direction of the arrow A by one half of the amount of this rotation. A length of the first flexible cable 4 which is equal to the shift is unwound from the lower case 1 to be wound into the corresponding second cable receiving groove 16 of the upper case 2. Meanwhile, the same length of the second flexible cable 5 is unwound from the upper case 2 to be wound into the corresponding first cable receiving groove 11 of the lower case 1. In this movement, the spacer 3 is driven by the bent portion 4' of each first flexible cable 4 which abuts the peripheral edge of the openings 18 in such a manner that the spacer 3 is rotated in the direction of the arrow A by one half of the amount of rotation of the upper case 2. Thus, the openings 18 are rotated, following the movement of the bent portions 4' and 5' of the flexible cables 4 and 5.

Accordingly, when, as shown in FIG. 6, the upper case 2 is rotated by $N \times 360°$ in the direction of the arrow A, the bent portions 4' and 5' as well as the spacer 3 are rotated by $N/2 \times 360°$ in the direction A. As a result, a length of each second flexible cable 5 corresponding to the rotation by $N/2 \times 360°$ is unwound from the second cable receiving groove 16, passed through the openings 18, and wound into the first cable receiving groove 11, whereas a length of each first flexible cable 4 corresponding to the rotation by $N/2 \times 360°$ is unwound from the first cable receiving groove 11, passed through the openings 18, and wound into the second cable receiving groove 16.

The upper case 2 can further be rotated in the direction of the arrow A until the greater part of each second flexible cable 5 wound in the second cable receiving groove 16 of the upper case 2 is completely unwound therefrom and wound into the first cable receiving groove 11 of the lower case 1. In other words, the upper case 2 can be rotated in the direction by $360° \times n$ at most, n being equal to two times the number of turns of the second flexible cable 5 wound on the upper case 2. When the rotation of the upper case 2 by this amount is completed, the greater part of each first flexible cable 4 wound in the first cable receiving groove 11 is completely unwound therefrom and wound into the second cable receiving groove 16.

Conversely, when, from a position of the clock spring where the greater part of each first flexible cable 4 is wound in the second cable receiving groove 16 of the upper case 2 while the greater part of each second flexible cable 5 is wound in the first cable receiving groove 11 of the lower case 1, the upper case 2 is rotated in the counterclockwise direction (in the direction of the arrow B), and results in the following operation. Since the bent portion 5' of each second flexible cable 5 abuts the peripheral edge of the openings 18 to rotate the spacer 3 in the direction of the arrow B, the bent portions 4' and 5' of the first and second flexible cables 4 and 5 as well as the spacer 3 rotate in the direction B by an amount corresponding to one half of the rotation of the upper case 2. Consequently, a length of the second flexible cable 5 corresponding to the shift of the spacer 3 is unwound from the first cable receiving groove 11 of the lower case 1, passed through the openings 18, and wound into the second cable receiving groove 16. Simultaneously, the same length of the first flexible cable 4 is unwound from the cable receiving groove 16, passed through the openings 18, and wound into the first cable receiving groove 11.

Figure 7:
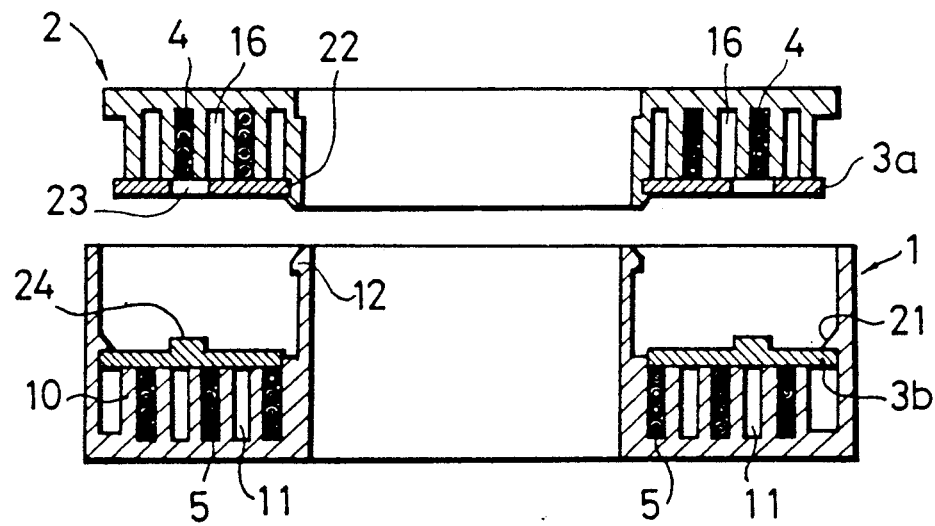

The processes for assembling the clock spring will be briefly described with reference to FIG. 7. First, the greater part of each second flexible cable 5 is coiled in the corresponding first cable receiving groove 11 of the lower case 1. Thereafter, the second spacer member 3b is inserted into the lower case 1 until the member 3b engages with the engagement protrusion 21 to be held thereby. This process can be easily performed because all of the second flexible cables 5 are wound in the same direction. The second flexible cables 5 are prevented from becoming disengaged from the grooves 11 due to the second spacer member 3b which serves as a cover.

In parallel with the above described processes, the greater part of each first flexible cable 4 is coiled in the corresponding second cable receiving groove 16 of the upper case 2. Thereafter, the first spacer member 3a is engaged with and held by the engagement stepped portion 22 so that the member 3a abuts on the lower end of the ridges 15 of the upper case 2. These processes can be easily performed for the same reason as above, i.e., because all the first flexible cables 4 are wound in the same direction. Disengagement of the first flexible cables 4 is prevented by the first spacer 3a. Although not shown in FIG. 7, one end of each first flexible cable 4 is passed through the openings 18 of the spacer members 3a and 3b, and extended through the cable extension hole to the outside of the lower case 1. Similarly, one end of each second flexible cable 5 is passed through the spacer openings 18, and is extended through the cable extension hole 17 to the outside of the upper case 2.

Finally, the resultant upper and lower case units are rotatably coupled to each other by snap-fitting. In this process, each pin 24 is inserted into the corresponding elliptic bore 23, thereby joining the first and second spacer members 3a and 3b together. The cable spring is completed in this way.

The clock spring according to the present invention is advantageous in that the length which the first and second flexible cables 4 and 5 must have corresponds to about one half of the maximum necessary amount of rotation. This enables a considerable reduction in the length of the flexible cables 4 and 5 from the length of conventional cables. In addition, a wire harness can be used as the flexible cables 4 and 5, thereby enabling a reduction in the total production cost of the clock spring. Another advantage of the short flexible cables 4 and 5 is that the diameter of the cable receptacle can be reduced. This helps to make the entire clock spring compact.

The clock spring is also advantageous in that, because the first and second concentric cable receiving grooves 11 and 16 are formed at a constant inter-groove pitch on the two opposing surfaces of the lower and upper cases 1 and 2, and because the spacer 3 is disposed in the space between the first and second cable receiving grooves 11 and 16, it is possible to prevent not only intertwining of the flexible cables 5 but also entangling of one section of a flexible cable 4 or 5 in the first cable receiving groove 11 with the other section in the second cable receiving groove 16. This enables smooth winding and unwinding of the flexible cables 4 and 5.

Furthermore, the first flexible cables 4 and the second flexible cables 5 are wound in different directions so that, during a rotation of the upper case 2, either the first or second flexible cables 4 or 5 drive the spacer 3 to rotate it. Thus, the mechanism for driving the spacer 3 is very simple, thereby allowing the entire clock spring to be made compact.

The spacer 3 comprises the first and second spacer members 3a and 3b which can be joined together. These members 3a and 3b are united when the upper and lower case units are snap-fitted to each other after either the first or second flexible cables 4 or 5 have been coiled and received in the compartment between the first cable receiving grooves 11 of the lower case 1 and the second spacer 3b, with the other flexible cables coiled and received in the other compartment between the second cable receiving grooves 16 of the upper case 2 and the first spacer 3a. Therefore, the first and second flexible cables 4 and 5 are prevented from uncoiling during the assembly, thereby enabling the clock spring to be assembled with a much higher efficiency than a clock spring having a single-member spacer.

Although in the above-described embodiment, the first and second spacer members 3a and 3b are joined together by the engagement between the elliptic bores 23 and the pins 24, the first and second spacer members may be simply superimposed on each other. In this case, even when the openings 18 of the spacer members 3a and 3b deviate from each other, the abutting of bent portions of the flexible cables 4 and 5 on the peripheral edge of the openings 18 serves to eliminate the deviation of the openings 18.

In the foregoing embodiment, the first and second cable receiving grooves 11 and 16 are integrally formed on the lower and upper cases 1 and 2, respectively. However, first and second cable receiving grooves 11 and 16 may be provided on spacer members 3a and 3b by, for instance, forming ridges 10 and 15 which are integral with the upper surface of the first spacer member 3a and the lower surface of the second spacer 3b. Alternatively, either the first or second cable receiving grooves 11 or 16 may be provided on one of the spacer members 3a or 3b.

Although the above-described embodiment concerns the case where the lower case 1 is used as the stationary member while the upper case 2 is used as the movable member, the reverse use is possible in which the upper and lower cases 2 and 1 are respectively used as the stationary and movable members.

Although in the foregoing embodiment, a wire harness having a plurality of covered wires is used as the first and second flexible cables 4 and 5, these wires may be substituted by, for instance, wires which are not covered by an insulator, or covered flat wires.

In the foregoing embodiment, the flexible cables 4 and 5 consisting of five cables, i.e., the two first flexible cables 4 and the three second flexible cables 5, are received in the first and second cable receiving grooves 11 and 16, each group comprising the same number of grooves. However, these numbers are, of course, mere examples and are not limitative. Further, it is not necessary that all the first and second cable receiving grooves 11 and 16 receive the flexible cables 4 and 5, and at least one cable 4 and at least one cable 5 may be received in selected ones of the grooves 11 and 16. In this case, a single clock spring is able to provide two or more sets of cable receiving grooves 11 and 16.

As described above, according to the present invention, a significant reduction in the length of the flexible cables is possible. Furthermore, during assembly, the respective coils of the flexible cables having different winding directions can be distributed among the movable and stationary members and received in one of them. Therefore, the clock spring can be produced at low cost and assembled with ease.

What is claimed is:

1. A clock spring having a stationary member, a movable member supported in such a manner as to be rotatable relative to said stationary member and a flexible cable received in a cable receptacle defined by said stationary and movable members, one end of said flexible cable being fixed to said stationary member and extended to the outside thereof, the other end of said flexible cable being fixed to said movable member and extended to the outside thereof; the improvement in said clock spring comprising: first and second rotary members superimposed on each other and interposed between said stationary and movable members in such a manner as to be rotatable relative thereto and bisect said cable receptacle into two opposing compartments, said first and second rotary members having openings communicating with each other; two groups of cable receiving grooves positioned in said two opposing compartments of said cable receptacle, each of said groups comprising a plurality of concentric cable receiving grooves, said groups being in different compartments of said receptacle; and a plurality of flexible cables each having two sections which are wound in two opposite directions and which are capable of being wound into the cable receiving grooves belonging to different groups, some of said flexible cables having first sections wound in the first of said two opposite directions and second sections passed through said openings and wound in the second direction, the remaining flexible cables having first sections wound in the second direction and second sections passed through said openings and wound in the first direction.

2. A clock spring as claimed in claim 1, wherein the two groups of cable receiving grooves positioned in the two opposing compartments of said cable receptacle are provided by forming two groups of ridges each comprising a plurality of ridges, said two groups of said ridges being integral with an upper surface of said first rotary member and a lower surface of said second rotary member which surfaces are in different compartments of said receptacle.

* * * * *